US006937790B2

(12) United States Patent
Bridges (10) Patent No.: US 6,937,790 B2
(45) Date of Patent: Aug. 30, 2005

(54) CORPORATE FEED FOR 40 GHZ MODULATORS AND METHOD FOR USE OF THE SAME

(75) Inventor: William B. Bridges, Sierra Madre, CA (US)

(73) Assignee: California Institute of Technology, Pasadena, CA (US)

(*) Notice: Subject to any disclaimer, the term of this patent is extended or adjusted under 35 U.S.C. 154(b) by 253 days.

(21) Appl. No.: 10/349,305

(22) Filed: Jan. 22, 2003

(65) Prior Publication Data

US 2003/0227666 A1 Dec. 11, 2003

Related U.S. Application Data

(60) Provisional application No. 60/351,441, filed on Jan. 23, 2002.

(51) Int. Cl.[7] .............................. G02B 6/00; G02B 6/26
(52) U.S. Cl. ........................................................ 385/30
(58) Field of Search .............................. 385/2, 3, 4, 14, 385/16, 24, 30, 31, 39, 147

(56) References Cited

U.S. PATENT DOCUMENTS

| | | | |
|---|---|---|---|
| 5,010,586 A | | 4/1991 | Mortimore et al. |
| 5,033,814 A | * | 7/1991 | Brown et al. .................. 385/16 |
| 5,291,565 A | | 3/1994 | Schaffner et al. |
| 6,014,237 A | | 1/2000 | Abeles et al. |
| 6,034,801 A | | 3/2000 | Pfeiffer |
| 6,388,782 B1 | | 5/2002 | Stephens et al. |
| 6,711,312 B1 | * | 3/2004 | Kornrumpf et al. .......... 385/14 |
| 6,763,151 B1 | * | 7/2004 | Bosso et al. ................... 385/3 |
| 2002/0154843 A1 | * | 10/2002 | Betts .............................. 385/2 |
| 2004/0120626 A1 | * | 6/2004 | Kornrumpf et al. ........... 385/2 |

* cited by examiner

Primary Examiner—Akm Enayet Ullah
(74) Attorney, Agent, or Firm—Daniel L. Dawes; Myers Dawes Andras & Sherman LLP (57) ABSTRACT

Improvements in an electro-optic modulator with a segmented optical transmission network with a series of discrete electrodes for successive segments of the network include drivers at the output of a corporate feed into the modular transmission line. The penalty of √N suffered from division of the input power is thus avoided. Respective modulating signals are supplied to the electrodes along the transmission lines whose lengths differ from each other, so that modulating signals arrive at their respective electrodes in synchronism with the propagation of an optical signal through the optical transmission network. The differential loss in the different feed line lengths in the corporate feed are compensated by adjusting the gains of the amplifiers or by incorporating additional attenuation in the legs of the corporate feed.

25 Claims, 4 Drawing Sheets

CORPORATE FEED FOR 40 GHZ MODULATORS AND METHOD FOR USE OF THE SAME

RELATED APPLICATIONS

The present application is related to U.S. Provisional Patent Application Ser. No. 60/351,441, filed on Jan. 23, 2002 which is incorporated herein by reference and to which priority is claimed pursuant to 35 USC 119.

BACKGROUND OF THE INVENTION

1. Field of the Invention

The invention relates to the field of electro-optical modulators and in particular modulation of an optical carrier with electrical signals in the GHz range.

2. Description of the Prior Art

Fiber optic links are important in a wide variety of applications such as millimeter wave communications and radar systems. An external electro-optic modulator is usually required for a millimeter wave fiber optic link, since direct modulation of a solid state laser signal is generally not possible above microwave frequencies. Traveling wave integrated optic modulators used for this purpose are known in the art, such as described in a paper entitled "17 GHz bandwidth electro-optic modulator", by C. Gee et al, in Applied Physics Letters, vol. 43, no. 11, Dec. 1, 1983, pp. 998–1,000. A typical traveling wave modulator includes a substrate formed of an electro-optic material, preferably crystalline lithium niobate ($LiNbO_2$). An optical waveguide is formed in the substrate just below the surface of the crystal by ion diffusion of titanium or proton exchange. The waveguide is single mode, and typically only a few microns wide. An optical signal from a laser or the like is fed into an input and retrieved from an output of the waveguide using focusing lenses or by close coupling to single mode optical fibers. A microwave strip line electrode is deposited on the surface of the substrate immediately adjacent to the optical waveguide. An electrical signal at microwave or higher frequency is applied across the segments of the strip line electrode through a coaxial cable. The electrode is terminated in a resistive load via a coaxial cable. The electrical signal applied to the electrode through the cable propagates along the electrode parallel to the optical waveguide as a traveling wave.

The segments are sufficiently small and close together that the transverse electric field therebetween resulting from the electrical signal propagating along the electrode passes through the optical waveguide and induces an incremental phase shift in the optical signal via the electro-optic effect. This incremental phase shift is integrated along the length of the optical waveguide to produce the net phase modulation. The optical waveguide can be split into two branches in a Mach-Zehnder type interferometer arrangement to provide amplitude modulation as described in the above referenced article to Gee et al.

The integrated effect of the incremental phase shift is cumulative as long as the optical and electrical signals propagate parallel to each other at the same phase velocity. However, this does not occur in practical electro-optic materials such as $LiNbO_2$. At optical frequencies, the refractive index of $LiNbO_2$ is $n_o = 2.2$, whereas at microwave and millimeter wave frequencies the refractive index is $n_{mm} = 5.3$ to 6.6, depending on the orientation ($LiNbO_2$ is anisotropic). Since the electric field between the segments of the strip line electrode passes through both air and $LiNbO_2$, the effective index of refraction for the electrical signal traveling along the electrode is on the order of $n_{eff} = 4$. This is still a mismatch with the $n_o = 2.2$ for the optical signal.

Due to the refractive index mismatch, the optical signal propagates with a phase velocity, which is approximately twice that of the electrical signal. The magnitude of the phase modulation progressively decreases as the phase difference between the optical and electrical signals increases. This phenomenon is known as a phase "walk off". The decrease in overall phase modulation with frequency f and interaction length L is equal to $[(\sin(AfL))/AfL]^2$, where $A = 2\pi/c(n_{eff} - n_o)$, and c is the speed of light.

This velocity mismatch necessitates design tradeoffs. The maximum achievable drive electrical drive signal frequency f decreases as the interaction length L is increased. Conversely, to lower the drive voltage and power, a long interaction length L is required. The modulator must be made shorter and the drive power larger as the frequency is increased to obtain satisfactory modulation.

Prior art attempts to compensate for this phase velocity mismatch include replacing the single electrode with a periodic electrode structure such as described in a paper entitled "Velocity-matching techniques for integrated optic traveling wave switch/modulators", IEEE Journal of Quantum Electronics, vol. QE-20, no. 3, March 1984, pp. 301–309. These periodic electrode structures can be categorized into either periodic phase reversal or intermittent interaction electrodes. Known intermittent interaction electrode configurations include unbalanced transmission lines, i.e., asymmetric about the propagation axis. This leads to incompatibilities with the balanced line (typically coaxial or waveguide probe) transitions to other fiber optic link transmitter components.

The periodic phase reversal structures break up the electrode into shorter sections, and force the phase shift between the sections to match the optical phase shift. The electrode is assumed to consist of four sections, with a 180 degree phase shift between the individual sections. The relative phase of the optical and electrical signals is effectively reset at the leading or upstream end of each section, and deviates to a maximum extent, which is inversely proportional to the length of the sections. Thus, the phase velocities are matched on the average. However, there is still a reduction in the modulation by the factor $[\sin(AfL_{section})/AfL_{section}]^2$, and $L_{section}$ is required to be long enough to produce a 180 degree phase delay. This also means that the 180 degree phase reversals are correct only at a single modulation frequency, so that the low-pass modulator is converted into a bandpass modulator.

Other problems that make it difficult to extend the operation of such modulators to millimeter wave or higher frequencies, involve the connection of modulation electrodes to the modulation signal source by coaxial cables, or through wire bonds or the like. This becomes unmanageable due to the extremely small physical dimensions involved.

Lithium niobate modulators for 40 GHz will require some means of countering velocity mismatch in order to retain sufficient modulation sensitivity. Several solutions are possible:

A first approach of the prior art is called "true" velocity matching. The phase velocity of the RF transmission is made to equal the optical velocity in the optical waveguide by adding a thick silicon dioxide buffer layer, and up-plating the transmission line conductor so that it extends significantly into the air above the chip. Both of these actions, pull the electric field out of the lithium niobate, thus increasing the phase velocity. Unfortunately, this also reduces the sensitivity. The argument that this loss in sensitivity can now be made up with a longer modulator is countered by the increasing electrode loss at EHF ranges.

A approach of the prior art is called velocity matching "on the average" by segmenting and rephasing the RF transmission line, for example by phase reversal or adding phase delay to match on a space harmonic. This scheme results in a band-pass structure and still is limited by electrode loss.

A third approach of the prior art is called velocity matching "on the average" by segmenting the modulator's RF transmission line and then feeding the segments with a "corporate feed" comprised of branched RF transmission lines which introduce true time delay to the segments. See U.S. Pat. Nos. 5,291,565 and 5,076,655, which are both incorporated herein by reference. In this case, the modulator remains a low-pass device. The electrode loss is counteracted since the loss per segment is now only $\alpha L/N$ rather than $\alpha L$, where $\alpha$ is a loss factor, L is an interaction length and N is the number of segments. Of course, the input power is divided by N so that a penalty of $\sqrt{N}$ is incurred. The trade-off to find the optimum value of N for a given value of $\alpha$ is discussed in the chapter by Bridges entitled "Antenna Coupled Millimeter-Wave Electro-Optical Modulators," in RF Photonic Technology in Optical Fiber Links, W. S. C. Chang, Editor, Cambridge University Press 2001. An additional penalty is imposed by the loss in the corporate feed itself, which is why U.S. Pat. Nos. 5,291,565 and 5,076,655 propose that the corporate feed be located on a separate low-loss ceramic substrate with optimized conductor widths and thicknesses.

A fourth approach is called velocity matching "on the average" by segmenting the modulator's RF transmission line as in the third approach discussed above, but then using free space propagation at an angle to provide the true time delay, then coupling to the segments by on-chip antennas. This avoids the added transmission line loss from the corporate feed, but now is limited by the bandwidth of the antennas. The third approach would seem to be a good one for digital lithium niobate modulators for 40 GHZ and above. The optimum value of N can be determined from the curves present in RF Photonic Technology in Optical Fiber Links referenced above, or the earlier discussion in Finbar T. Sheehy's Ph.D. thesis referenced therein.

BRIEF SUMMARY OF THE INVENTION

The illustrated embodiment of the invention is an improvement in an electro-optic modulator, which is comprised of a first substrate, an optical transmission network on the first substrate, a plurality of separate segmented electrodes distributed in a cascade arrangement on the first substrate in the direction of optical transmission for modulating successive respective segments of the optical transmission network, a second substrate, and a plurality of separate modulating signal transmission lines disposed on the second substrate lateral to the optical transmission network on the first substrate for transmitting modulating signals to respective ones of the segmented electrodes to modulate an optical signal transmitted through the optical transmission network, the modulating transmission lines having respective input ends and individual lengths that are selected so that modulating signals applied to the input ends of the modulating transmission lines with a predetermined phase relationship reach their respective electrodes in synchronism with the propagation of an optical signal through the optical transmission network. The improvement comprises a plurality of amplifiers disposed on the second substrate at the outputs of the modulating transmission lines, so that a maximum voltage is applied to each separate segmented electrode of the optical transmission network.

In one embodiment the modulating transmission lines have corresponding feed line lengths and the plurality of amplifiers have adjustable gains, so that each gain is adjusted to compensate for the corresponding feed line lengths.

In another embodiment the modulating transmission lines have corresponding feed line lengths and further comprising a corresponding plurality of attenuation resistors coupled to the modulating transmission lines, each attenuation resistor having a corresponding impedance selected to compensate for the corresponding feed line lengths. The plurality of attenuation resistors and amplifiers can also be combined. The plurality of attenuation resistors are disposed on the second substrate.

The plurality of amplifiers and the plurality of transmission lines have an impedance independent of any connector and coax line impedance.

The plurality of transmission lines have branches forming a branching pattern. The branches of the transmission lines and the plurality of amplifiers have an impedance optimized for their coupling to each of the plurality of separate segmented electrodes on the first substrate given the branching pattern of the transmission lines.

The invention is also to be understood as including within its scope a method of performing the above improvements in which the step of amplifying is to be understood in its most general sense of both magnification and attenuation.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
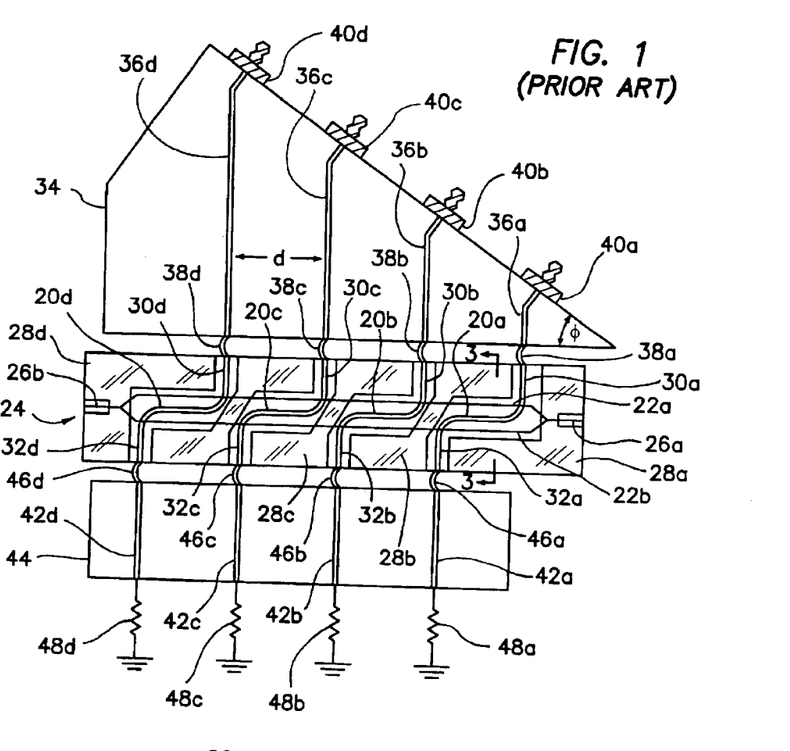
FIG. 1 is a plan and partially schematic view of a prior art March-Zehnder interferometer.

First, some background may be helpful in understanding the improvement of the present invention. As previously shown in U.S. Pat. No. '565 to increase the modulator's efficiency without sacrificing bandwidth, yet still retain a compact essentially two-dimensional structure, a circuit as shown in FIG. 1 is provided. The modulator is segmented, with a series of discrete center electrodes 20a, 20b, 20c and 20d. Although four electrodes are illustrated, any desired number could be provided. The length of each individual electrode is limited so that it has a high associated bandwidth; the bandwidth of the overall modulator is determined by the lengths of its individual electrodes, not by the modulator's aggregate length. On the other hand, as demonstrated below the modulator's overall efficiency is significantly higher than the efficiency of any individual segment.

An optical waveguide is divided into two arms 22a and 22b on the same substrate 24 as the electrodes 20a–20d, with the optical arms extending continuously on opposite sides of the electrodes. The optical arms are joined at input and output Y-junctions into input and output waveguides 26a and 26b, respectively.

The substrate surface is coated with ground plane electrode 28a–28d surrounding the center electrodes 20a–20d and optical arms 22a and 22b, with gaps left in the ground plane electrode for the input and output waveguides 26a, 26b and for RF connector feeds to the center electrodes. The electrodes are typically formed from gold about 2.5 microns thick, while the substrate is again typically $LiNbO_3$ and the waveguides titanium diffused into the $LiNbO_3$. The center electrodes 20a–20d are preferably implemented as lines that are formed integrally with laterally extending input connector lines 30a–30d at one end of the respective electrodes and RF output lines 32a–32d at the opposite ends of the respective electrodes.

A separate substrate 34 is preferably provided lateral to the interferometer substrate 24 to provide a base for electrical transmission microstrip lines 36a, 36b, 36c and 36d. These lines are used to feed the center electrodes 20a–20d with RF power, and to provide phase synchronization between the RF power supply and the optical signal propagating through the modulator. Since the transmission line substrate 34 does not carry any optical waveguides, it can be formed from materials such as alumina or quartz, which are better microwave substrates and are considerably less expensive than the $LiNbO_3$ substrate 24 used for the optical portion of the modulator. While the transmission line substrate 34 could be fabricated integrally with and from the same material as optical substrate 24, this would alter the microstrip transmission properties and would also require a greater use of the relatively expensive $LiNbO_3$ optical substrate material. The microstrip RF feed lines 36a–36d are preferably formed from the same material and with the same dimensions as the center electrodes 20a–20d. The two substrates 24 and 34 are held together side-by-side by a suitable fixture (not shown) to which the substrates are cemented, with gold bonded wire jumpers 38a–38d connecting the RF microstrip lines 36a–36d to their respective electrode connector lines 30a–30d. The electrode grounds 28a–28d are connected to the microstrip lines' ground under the microstrip substrates 34, 44 by wrapping the electrode around the edge of the substrate 24.

Millimeter wave RF signals are supplied to the transmission lines 36a–36d from respective coaxial cables (not shown) through respective coaxial-to-microstrip line adapters 40a–40d. These could be implemented as K-connector® adapters up to 40 GHz or V-connector® adapters up to 65 GHz, supplied by the Wiltron Company.

Microstrip termination lines 42a–42d are fabricated on a separate alumina or quartz substrate 44 that is coplanar with optical substrate 24, on the opposite side from the input transmission line substrate 34. The output lines 42a–42d are connected on one side via wire jumpers 46a–46d to the output electrode connector lines 32a–32d on the optical substrate 24, and on their opposite sides to respective termination resistors 48a–48d. As with the input transmission substrate 34, output substrate 44 could be formed integrally with the optical substrate 24, but a separate member of less expensive material is preferred.

In FIG. 1 it is assumed that an RF signal has been previously divided by a coaxial power splitter (not shown), and that the phase of each RF signal entering the adapters 40a–40d is equal. However, the invention is also applicable to situations in which the RF signals for the various input transmission lines are out of phase with each other, so long as the initial phase differences are known. Input transmission lines 36a–36d preferably extend parallel to each other in a lateral direction away from the center electrodes 20a–20d. The length of each input transmission line is selected to delay its respective RF signal so that the various input RF signals reach their respective modulator segments in synchronism with the arrival of an optical waveguide signal at the same segments. In other words, each successive transmission line 36a–36d is made longer than the previous line so that its RF signal has a longer delay, and therefore reaches its respective electrode slightly after the preceding electrode has been energized with an RF signal. The transmission line length differentials are selected so that the incremental RF signal delay for each successive electrode matches the time required for the optical signal to travel between successive electrodes.

The input transmission lines 36a–36d could be formed in wandering paths on input substrate 34 to achieve the desired differential lengths. Preferably, however, the transmission lines are parallel and the substrate 34 is cut into a generally wedge shape. An angle φ is formed between the edge of substrate 34 that runs parallel to the optical substrate 24, and the opposite edge of substrate 34 that bears the coaxial-to-microstrip adapters 40a–40d. If the distance between successive modulating electrodes is d, then the time t required for the optical signal to travel from one modulator to the next is:

$$T = 2.2 d/c$$

To match this time delay, each RF microstrip line 36b–36d must be longer than the preceding line by:

$$\Delta d = d \tan \phi = v_{RF} t$$

where $v_{RF}$ is the phase velocity of the RF signal on the microstrip lines. The angle φ at which the input substrate is cut is therefore defined by:

$$\tan \phi = 2.2/\sqrt{\epsilon_{RF}}$$

where $\epsilon_{RF}$ is the effective RF dielectric constant for the microstrip. With an alumina substrate $\epsilon_{RF}=9.9$ and φ=35°, while for quartz substrate $\epsilon_{RF}=3.8$ and φ=48°. Adjustments to these angles would be made for variations of $\epsilon_{RF}$ due to the thickness of the microstrip substrate and the width of the microstrip lines.

The time delay in the described modulator is extremely broadband, varying only as the relatively small dispersion in the microstrip line. The modulator's efficiency, measured as the depth of modulation M, is proportional to the drive voltage V, which in turn is proportional to the square root of the RF power delivered to each electrode $20a$–$20d$. Assuming the modulator has N electrodes, the total RF power $P_{RF}$ is divided N ways, so that the modulating voltage on each electrode is proportional to $\sqrt{(P_{RF}/N)}$. The modulator's overall efficiency $M_o$ for an array of N electrodes is thus equal to $\sqrt{N} M_S$, where $M_S$ is the depth of modulation for a single electrode.

Figure 2:
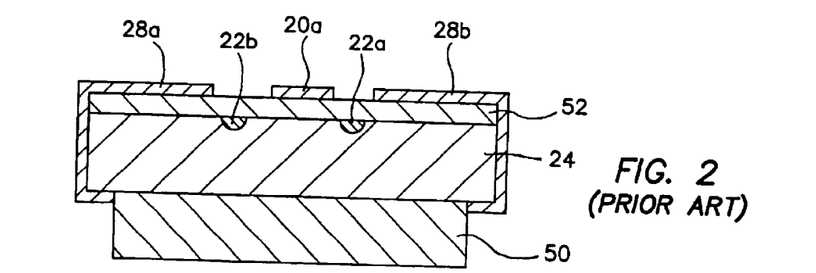
FIG. 2 is a sectional view, not to scale, take along the section line 3—3 of FIG. 1.

FIG. 2 is a sectional view of the modulator substrate 24, taken along the section line 3—3 in FIG. 1. The ground plane electrodes $28a$, $28b$ are shown wrapping around the edges of the substrate to make electrical contact to the microstrip line ground. The $LiNbO_3$ substrate 24 is cemented to a non-metallic support block 50. Instead of wrapping around the edges of the substrate 24, the ground electrodes $28a$, $28b$ could be connected to the ground plane through conductive vias that extend through the substrate.

A buffer layer 52 of a suitable insulator material such as $SiO_2$ separates the electrode $28a$, $28b$ from the underlying waveguide $22a$, $22b$. The buffer layer's dielectric constant is selected so that the optical signal propagating along the waveguide undergoes total internal reflection at the buffer layer interface, and is thereby prevented from leaking into the electrode. In practice it is convenient to form a blanket buffer layer over the entire area of substrate 24, but if desired the buffer layer could be etched away except where it separates the electrodes from the waveguides. A thickness of about 1,500–10,000 Angstroms is preferred for the buffer layer; a thinner buffer can lead to optical losses into the electrodes, while thicker layers can move the RF electrodes signal too far from the waveguides.

Figure 3:
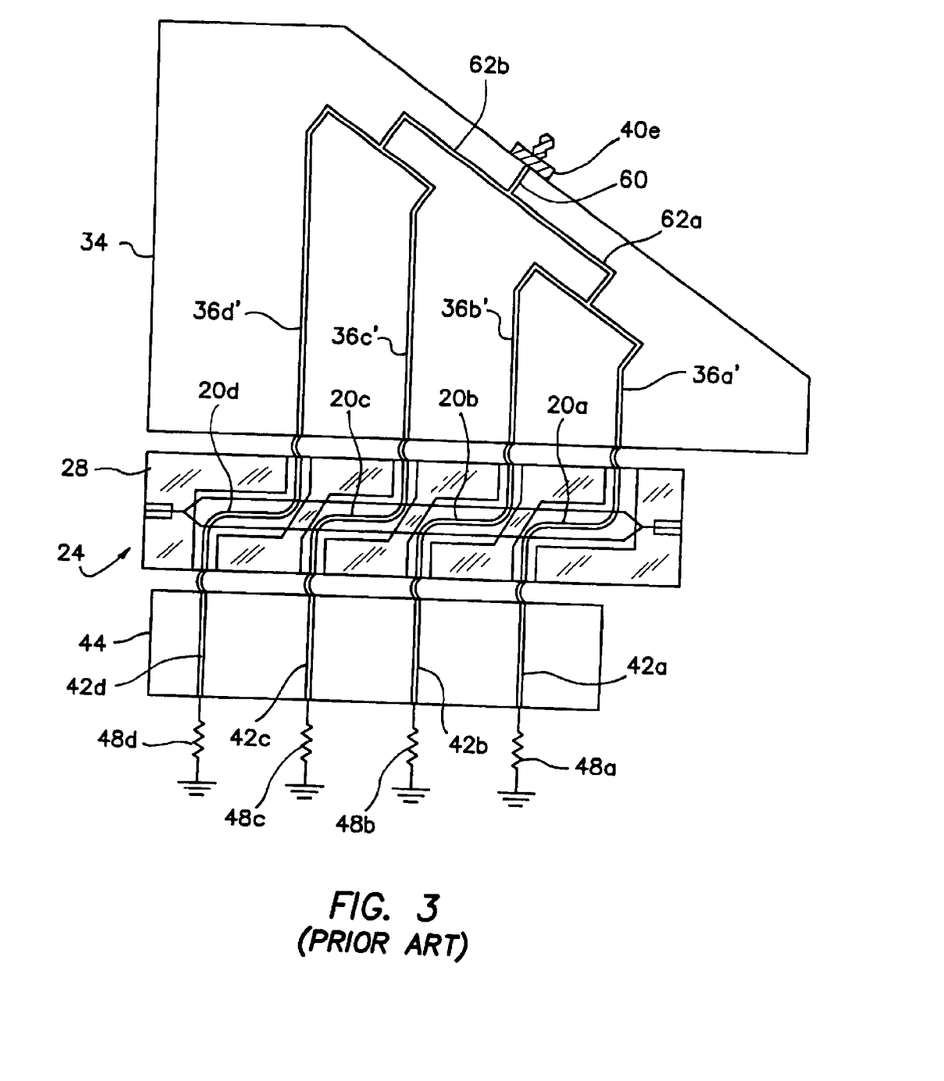
FIG. 3 is a plan view of a prior art embodiment similar to FIG. 1, but with a common electrical feed.

A modulator that employs a single coaxial-to-microstrip adapter $40e$ is shown in FIG. 3. In this embodiment the RF signal is divided by a corporate feed structure into separate signals for each electrode. With four segments in the illustration of FIG. 3, a single RF input microstrip line 60 receives the RF signal from adapter $40e$ and divides into a pair of microstrip lines $62a$ and $62b$, which in turn divide into four microstrip lines $36a'$–$3d'$ that supply the individual electrodes. The length differentials between microstrip lines $36a'$–$3d'$ is the same as for lines $36a$–$36d$ in FIG. 1, resulting in the same relative RF delays and a consequent synchronization between the electrode energizations and the optical propagation through the modulator.

With four input microstrip lines as illustrated in FIG. 3, if the electrode impedance is 25 ohms the RF input impedance must be 6.25 ohms. Microstrip transformers can be used to bring the input impedance level up to 50 ohms, while limiting the bandwidth. Other types of microstrip line power dividers could also be used, such as 3 dB hybrid couplers or Wilkinson combiners, as described in Ha, Solid State Microwave Amplifier Designs, John Wiley & Sons, Inc., 1981, pages 248–260. Such dividers would maintain the desired impedance level while increasing the bandwidth over that of a single transformer.

Figure 4:
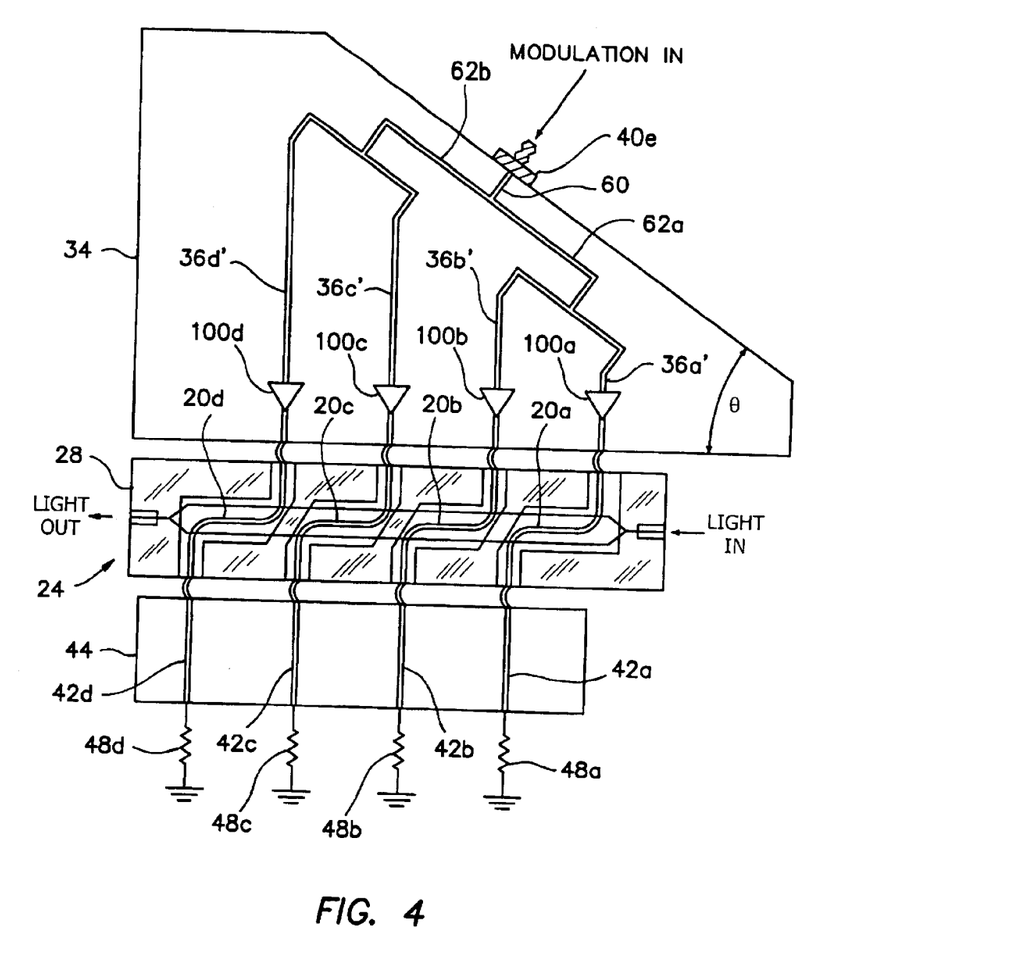
FIG. 4 is a plan and partially schematic view of a first embodiment of the improvements of the invention made to the March-Zehnder interferometer of FIG. 3.

The improvement of the present invention is directed to the case where the driver electronics are essentially voltage limited rather than power limited. At the cost of additional complexity, the driver amplifiers $100a$–$100d$ in FIG. 4 are moved to the output end of the corporate feed $36a'$–$36d'$, so that the maximum voltage can be applied to each segment $20a$–$20d$ of the modulator's transmission line, but with the amplifiers $100a$–$100d$ inserted at the output end of the feed structure $36a'$–$36d'$. In this case, the $\sqrt{N}$ penalty does not apply.

Another advantage now accrues with the driver amplifiers $100a$–$100d$ located in this position, namely, that the differential loss in the different feed line lengths in the corporate feed $36a'$–$3d'$ can be compensated by adjusting the gains of the amplifiers $100a$–$100d$, or by incorporating additional attenuation in the legs of the corporate feed $36a'$–$36d'$.

Figure 5:
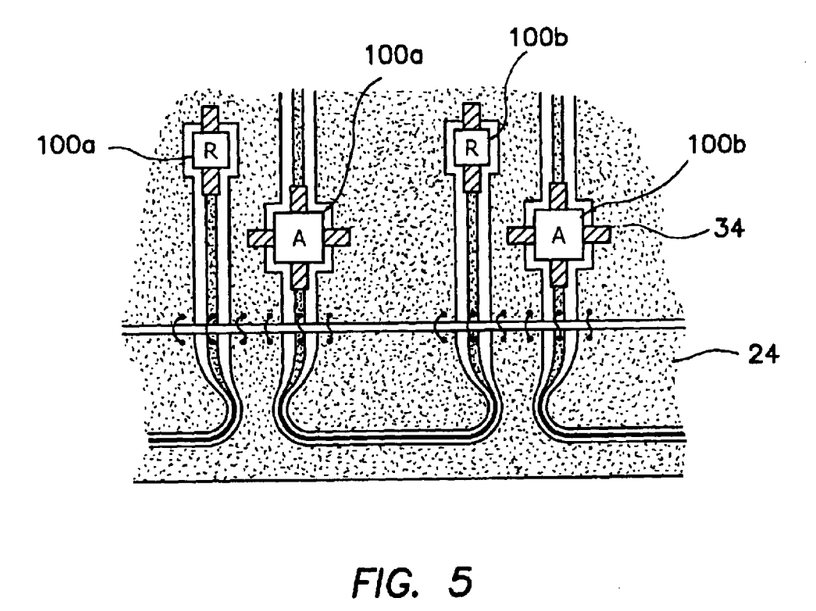
FIG. 5 is a plan diagrammatic enlarged view of a second embodiment of the improvements of the invention made to the March-Zehnder interferometer of FIG. 3 showing the disposition of the ceramic chip of the resistors and amplifiers employed in the improvement.

Another embodiment is shown in FIG. 5, where the modulator transmission line in chip 24 has been bent in such a way that both the feed amplifiers $100a$–$100d$ and the corresponding terminating resistors $102a$–$102d$ are located on the same low-loss ceramic substrate 34.

A further advantage of locating the driver amplifiers $100a$–$100d$ adjacent to the modulator chip 24 is that neither the driver amplifier output impedance nor the modulator transmission line need be fixed at 50 ohms, to match a connector and coax line impedance value. Instead, the optimum compromise impedance may be chosen. Similarly, the corporate feed branching structure $36a'$–$36d'$ impedances may now be chosen independently of the modulator input impedance, and can be chosen to exhibit 50 Ohms at the input, but higher at the input to the corresponding driver $100a$–$100d$ (high impedance), depending on the value of N. For N=4, the corporate feed lines $36a'$–$36d'$ will be 50, 100, and 200 Ohms for the three branches shown in FIG. 3 to compensate for the branching, and any added loss with the higher impedance lines can be made up at the final driver amplifier.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in an electro-optic modulator, which is comprised of a first substrate, an optical transmission network on the first substrate, a plurality of separate segmented electrodes distributed in a cascade arrangement on the first substrate in the direction of optical transmission for modulating successive respective segments of the optical transmission network, a second substrate, and a plurality of separate modulating signal transmission lines disposed on the second substrate lateral to the optical transmission network on the first substrate for transmitting modulating signals to respective ones of the segmented electrodes to modulate an optical signal transmitted through the optical transmission network, the modulating transmission lines having respective input ends and individual lengths that are selected so that modulating signals applied to the input ends of the modulating transmission lines with a predetermined phase relationship reach their respective electrodes in synchronism with the propagation of an optical signal through the optical transmission network, the improvement comprising:

a plurality of amplifiers disposed on the second substrate at the outputs of the modulating transmission lines, so that a maximum voltage is applied to each separate segmented electrode of the optical transmission network.

2. The improvement of claim 1 wherein the modulating transmission lines have corresponding feed line lengths and wherein the plurality of amplifiers have adjustable gains, so that each gain is adjusted to compensate for the corresponding feed line lengths.

3. The improvement of claim 1 wherein the modulating transmission lines have corresponding feed line lengths and further comprising a corresponding plurality of attenuation resistors coupled to the modulating transmission lines, each attenuation resistor having a corresponding impedance selected to compensate for the corresponding feed line lengths.

4. The improvement of claim 2 further comprising a corresponding plurality of attenuation resistors coupled to the modulating transmission lines in circuit with corresponding ones of the plurality of amplifiers, each attenuation resistor having a corresponding impedance selected to compensate for the corresponding feed line lengths given the gain of the corresponding amplifier.

5. The improvement of claim 3 wherein the plurality of attenuation resistors are disposed on the second substrate.

6. The improvement of claim 4 wherein the plurality of attenuation resistors are disposed on the second substrate.

7. The improvement of claim 1 wherein the plurality of amplifiers have an impedance independent of any connector and coax line impedance.

8. The improvement of claim 1 wherein the plurality of transmission lines have an impedance independent of any connector and coax line impedance.

9. The improvement of claim 1 wherein the plurality of transmission lines have branches forming a branching pattern, and wherein the branches of the transmission lines and the plurality of amplifiers have an impedance optimized for their coupling to each of the plurality of separate segmented electrodes on the first substrate given the branching pattern of the transmission lines.

10. An improvement in a method of modulating an optical signal, comprising transmitting the optical signal through an optical transmission network that is disposed on a first substrate, applying respective separate electrical modulating signals to successive cascaded segments of the optical transmission network in the direction of optical transmission and in synchronism with the transmission of an optical signal through the network, and supplying the electrical modulating signals to the segments along a plane lateral to the optical transmission network, wherein the electrical modulating signals are transmitted along a second substrate lateral to first substrate before being supplied to the optical transmission network along the first substrate, the improvement comprising:

amplifying the electrical modulating signals at the output of the second substrate, so that a selected optimal voltage is applied to each separate cascaded segment of the optical transmission network.

11. The improvement of claim 10 wherein the electrical modulating signals are supplied on the second substrate on modulating transmission lines each have a corresponding feed line length and wherein amplifying the electrical modulating signals amplifies each of the signals at a corresponding selected gain, so that each gain is adjusted to compensate for the corresponding feed line lengths.

12. The improvement of claim 10 wherein the electrical modulating signals are supplied on the second substrate on modulating transmission lines each have a corresponding feed line length and wherein amplifying the electrical modulating signals comprises attenuating each of the signals at a corresponding selected attenuation, so that each attenuation is adjusted to compensate for the corresponding feed line lengths.

13. The improvement of claim 11 wherein the electrical modulating signals are supplied on the second substrate on modulating transmission lines each have a corresponding feed line length and wherein amplifying the electrical modulating signals further comprises attenuating each of the signals at a corresponding selected attenuation, so that each attenuation is adjusted to compensate for the corresponding feed line lengths.

14. The improvement of claim 10 wherein amplifying the electrical modulating signals is performed independently of any connector and coax line impedance.

15. The improvement of claim 11 wherein the plurality of transmission lines have branches forming a branching pattern and a plurality of amplifiers with one amplifier at each output of the branching pattern, and further comprising optimizing the impedance of the branches of the transmission lines and the plurality of amplifiers for their coupling to each of the cascaded segments on the first substrate given the branching pattern of the transmission lines.

16. An improvement in a method of modulating an optical signal comprising transmitting the optical signal through an optical transmission network that is disposed on a first substrate, applying respective electrical modulating signals to successive segments of the optical transmission network in synchronism with the transmission of an optical signal through the network, and supplying the electrical modulating signals to the segments along a plane lateral to the optical transmission network, wherein the electrical modulating signals are transmitted along respective signal paths that are generally coplanar with the optical transmission network, the respective lengths of the paths being selected so that input modulating signals that have a predetermined phase relationship arrive at the optical transmission network in synchronism with the transmission of an optical signal through the network, the improvement comprising:

amplifying the electrical modulating signals so that a selected optimal voltage is applied to each separate cascaded segment of the optical transmission network.

17. An electro-optic modulator comprising:
a first substrate;
an optical transmission network on the first substrate;
a plurality of separate segmented electrodes distributed in a cascade arrangement on the first substrate in the direction of optical transmission for modulating successive respective segments of the optical transmission network;
a second substrate;
a plurality of separate modulating signal transmission lines disposed on the second substrate for transmitting modulating signals to respective ones of the segmented electrodes thereon, the modulating transmission lines having individual feed line lengths; and
a plurality of amplifiers disposed on the second substrate at the outputs of the modulating transmission lines, so that a maximum voltage is applied to each separate segmented electrode of the optical transmission network.

18. The electro-optic modulator of claim 17 wherein the plurality of amplifiers have adjustable gains, so that each gain is adjusted to compensate for the corresponding feed line lengths.

19. The electro-optic modulator of claim 17 further comprising a corresponding plurality of attenuation resistors coupled to the modulating transmission lines, each attenuation resistor having a corresponding impedance selected to compensate for the corresponding feed line lengths.

20. The electro-optic modulator of claim 18 further comprising a corresponding plurality of attenuation resistors coupled to the modulating transmission lines in circuit with corresponding ones of the plurality of amplifiers, each attenuation resistor having a corresponding impedance selected to compensate for the corresponding feed line lengths given the gain of the corresponding amplifier.

21. The electro-optic modulator of claim 19 wherein the plurality of attenuation resistors are disposed on a second substrate.

22. The electro-optic modulator of claim 20 wherein the plurality of attenuation resistors are disposed on a second substrate.

23. The electro-optic modulator of claim 17 wherein the plurality of amplifiers have an impedance independent of any connector and coax line impedance.

24. The electro-optic modulator of claim 17 wherein the plurality of transmission lines have an impedance independent of any connector and coax line impedance.

25. The electro-optic modulator of claim 17 wherein the plurality of transmission lines have branches forming a branching pattern, and wherein the branches of the transmission lines and the plurality of amplifiers have an impedance optimized for their coupling to each of the plurality of separate segmented electrodes on the first substrate given the branching pattern of the transmission lines.

* * * * *